United States Patent [19]

Dauerman

[11] Patent Number: 5,698,762
[45] Date of Patent: Dec. 16, 1997

[54] MICROWAVE-ASSISTED PYROLYSIS OF WASTE POLYAROMATIC HYDROCARBONS

[76] Inventor: Leonard Dauerman, 274 McElroy Ave., Fort Lee, N.J. 07024

[21] Appl. No.: 353,062

[22] Filed: Dec. 9, 1994

[51] Int. Cl.$^6$ ....................................................... A62D 3/00
[52] U.S. Cl. .......................... 588/227; 588/210; 588/212; 588/219; 588/225; 588/237; 219/678; 204/157.15; 204/157.43; 204/158.2; 204/158.21; 110/346
[58] Field of Search .................................. 588/210, 212, 588/219, 225, 227, 237; 110/346; 219/678; 204/157.15, 157.43, 158.2, 158.21

[56] References Cited

U.S. PATENT DOCUMENTS

| | | | |
|---|---|---|---|
| 4,345,983 | 8/1982 | Wan | 588/237 |
| 4,935,114 | 6/1990 | Varma | 204/157.43 |
| 5,280,149 | 1/1994 | Schneider et al. | 588/256 |

FOREIGN PATENT DOCUMENTS 0426926   5/1991   European Pat. Off. .

*Primary Examiner*—Cecilia J. Tsang
*Assistant Examiner*—C. Delacroix-Muirheid
*Attorney, Agent, or Firm*—Leonard Dauerman

[57] ABSTRACT

Polyaromatic hydrocarbons are highly carcinogenic ubiquitous industrial wastes. In this Invention, concentrations of said wastes are diminished by microwave-assisted pyrolysis. Prior to exposure to microwave radiation, said wastes are covered with a non-combustible material consisting of loose, discrete particles like sand. Susceptors may be added to the waste prior to radiation. Volatiles from the process can be absorbed in a susceptor like granulated activated charcoal. When saturated, this granulated activated charcoal is added to the said wastes in a subsequent treatment.

12 Claims, No Drawings

MICROWAVE-ASSISTED PYROLYSIS OF WASTE POLYAROMATIC HYDROCARBONS

FIELD OF THE INVENTION

The field of this invention is processes to effect the remediation of organic wastes using microwave energy: Class 588/210, 212, 219, 225, 237.

BACKGROUND OF THE INVENTION

The existence of waste (discarded material, whether accidentally or intentionally; classed as hazardous or otherwise) or polyaromatic hydrocarbons on substrates (solids like soil that may contain other wastes) is ubiquitous: in pits on utility plants—residues from the burning of coal to produce electricity; in the grounds of wood treating facilities—the wastes from wood treatment based upon the application of polyaromatic hydrocarbons going back to England in 1825 where it was first used on railroad ties (Encyclopedia Brittannica); in the waste wood so treated, and the surrounding soil into which the polyaromatic hydrocarbons have leached; also, wastes in the ground, in pits, and lagoons on many chemical facility sites.

The existence of the said wastes is portentous: They are highly carcinogenic. Their carcinogenicity has been reported as far back as the 18th Century.

A "universal" process for treating substrates contaminated with hazardous wastes has to be founded upon non-specific oxidation or reduction processes. For oxidation, that "universal" process is combustion, exemplified by incineration; for reduction, it is thermal heating in an inert atmosphere to reduce organics to the elemental carbon state and the disproportionation of salt to the elemental metallic states: the corresponding process is termed pyrolysis.

On the one hand, incineration has shortcomings because a plethora of oxygenated species is formed (Cheremisinoff, P. E. 1987. Waste Incineration—Pocket Hand Book. Podvan Publishing Co., Norhtbrook, Il. Pp. 1–3), metal ions can't be detoxified, the resulting substrate may be a hazardous waste, and the NIMBY ("Not In My Backyard!") syndrome (Superfund Record of Decision, MD, EPA/ROD/R003-88/051. Jun. 29, 1988).

On the other hand, since pyrolysis is a distillation process in the absence of air, the wastes are broken down into ". . . solid, liquid, and gasous products." (Cheremisinoff, P. E. 1987. Waste Incineration—Pocket Hand Book. Podvan Publishing Co., Northbrook, Il. Pp. 72–74, P. 116.). Thus reaction products are not formed; the elemental carbon formed, a major component of the solid phase, is not hazardous; the metals formed in the elemental state are not hazardous.

Pyrolysis is inherently superior to incineration, but to effect pyrolysis it is necessary to exclude oxygen when the material is heated: That condition is impractical in a thermal oven because a means is needed to heat the waste substrate; so, instead of operating in an oxygen-free atmosphere, thermally-assisted pyrolysis is effected by lowering the oxygen contentration of the the ambient air: limited combustion occurs to heat the substrate.

Microwave-assisted processes to effect the remediation of wastes have focussed on (reviewed in Microwave Processing of Materials, Publication NMAB-473, National Academy Press, Washington, D.C. 1994):

- the volatilization of organics by either direct microwave absorption or by steam distillation (Windgasse, G. and L. Dauerman. 1992. Microwave Treatment of Hazardous Wastes: Removal of Volatile and Semi-Volatile Organic Contaminants From Soil. Journal Microwave Power. 27(1):23–32; George, C. E., I. Jun, and J. Fan. 1991. Application of Microwave Heating Techniques to the Detoxification of Contaminated Soils. Pp. 459–466 in Ceramic Transactions, Vol. 21, Microwaves: Theory and Application in Materials Processing. D. E. Clark, F. D. Gac, and W. H. Sutton, eds. Westerville, Ohio: American Ceramic Society.);

- volatilization and chemical reactions (Varma, R. and S. P. Nandi. 1991. Oxidative Degradation of Trichlorethylene Adsorbed on Active Carbons: Use of Microwave Energy. Pp. 476–473 in Ceramic Transactions, Vol. 21, Microwaves: Theory and Aplication in Material Processing. D. E. Clark, F. D. Gac, and W. H. Sutton, eds. Westerville, Ohio: American Ceramic Society; Varma, R., S. P. Nandi, and J. D. Katz. 1991. Detoxification of Hazardous Waste Streams Using Microwave-Assisted Fluid-Bed Oxidation. Pp. 67–68 in Materials Research Society Symposium Proceedings, Vol. 189, Microwave Procesing of Materials II. W. B. Snyder, W. H. Suton, M. F. Iskander, and D. L. Johnson, eds. Pitsburgh, Pa.: Materials Research Society.);

- volumetric heating of specific constituent chemicals to bring about organic and inorganic reactions in a hazardous waste contaminated substrate (Zhu, N. L. Dauerman, H. Gu, and G. Windgasse. 1992. Microwave Treatment of Hazardous Wastes: Remediation of Soils Contaminated by Non-Volatile Organic Chemicals Like Dioxins. Journal Microwave Power. 27(1):54–61; Sedhom, E., Dauerman, L., Ibrahim, N., and Windgasse, G. 1992. Microwave Treatment of Hazardous Wastes: "Fixation" of Chromium in Soil. Journal Microwave Power. 27(2): 81–86.);

OBJECTS OF THE INVENTION

The objects of this Invention are a series of processes that effect pyrolytic destruction of wastes containing polyaromatic hydrocarbons by microwave radiation.

SUMMARY OF THE INVENTION

Since condensed phases can be heated directly by microwave radiation, pyrolysis can be effected by "smothering" the condensed substrate with a "covering," like sand. The "covering" consists of discrete particles that will not absorb microwaves strongly. Other examples of such "coverings" comprise clean soil, any salts, or combinations of the aforementioned materials. The composition of the "covering" can be varied to suit the particular waste: thus, materials can be added to the "covering" to effect the quantitative lowering of potential volatile emissions, and the preferential removal of specific volatiles. For example: soda ash thermally decomposes to form basic sodium oxide, one of the few chemicals that can react with PCBs. Also, if the substrate contains silica, a common component of soil and sand, it can be expected that excess soda will combine with silica to form glass: Vitrification is achievable.

If the waste does not self-heat at ambient temperatures or the rate of self-heating is not optimal for processing, then, susceptors such as water, scrap iron, and granulated activated charcoal, respectively, can be added initially.

In addition to varying the composition of the "covering" and the "waste," respectively, pre treatment of the wastes may be an optimal approach: In our studies we have found that if 30% hydrogen peroxide is added to the "waste," then, the diminishment in the concentration of polyaromatic hydrocarbons is effected at a lower temperature.

In contrast, pyrolysis in thermal ovens to effect waste minimization entails changing the air composition to lower the oxygen content so that minimal combustion occurs to provide the heat need to effect the distillation of the hydrocarbons (see supra, P. E. Cheremisinoff, Pp. 72–74, P. 116).

PREFERRED EMBODIMENTS OF THE INVENTION

Creosotes are coal tar distillates used for the treatment of wood since 1825. Said creosotes contaminate the soil at the abandoned GLC Wood Treating Facility in Sydney, N.Y. Studies were carried out on soil samples from that facility.

Results on three types of processes and the untreated sample are presented in Table 1. The concentrations of the listed compounds which comprise the creosotes were obtained as follows: following microwave treatment, except for the untreated sample, the solid substrates were subjected to Soxhlet extraction in accordance with EPA protocols. Samples of the resulting liquid were analyzed by first being volatilized, then, said volatiles were separated by gas chromatography, followed by mass spectrometry analysis.

All the studies were carried out in a domestic microwave oven. Samples were treated as follows:

Sample 6A—Forty five (45) grams of the waste were placed in a 150 mL pyrex beaker. The waste was covered with sodium chloride, approximately ½" above the level of the waste. After approximately five (5) minutes of microwave treatment, the waste glowed red hot. After approximately seven (7) minutes the treatment was stopped. After cooling, it was observed that the salt had vitrified, and, also, the substrate was a solid mass.

A control study was run as follows: Forty five (45) grams of the waste were placed in a 150 mL beaker; no "covering" was placed on the waste. Three minutes after microwave treatment, a fire was observed.

Sample 6B—Twenty five (25) grams of waste and 2.5 grams of electrolytic grade iron powder were mixed in a 150 mL beaker. The mixture was covered with approximately 1" sand. After six (6) minutes treatment, the substrate glowed red hot. The treatment was stopped after eight (8) minutes. After cooling, it was observed that the substrate had solidified.

Sample 6C—Twenty five (25) grams of waste and 2.5 grams of water were mixed. The mixture was covered with approximately 1.5" sand. The waste glowed red hot after fifteen (15) minutes. The treatment was stopped after twenty two (22) minutes. After cooling, the substrate was observed to have solidified.

Looking at the results in Table 1, it is seen that a total of approximately 4700 ppm of the polyaromatic hydrocarbons were extracted from the substrate before treatment. Following microwave treatment, no polyaromatic hydrocarbons were detected in the extracts from samples 6A, 6B, and 6C, respectively.

It is concluded that microwave treatment of the covered waste effects its destruction without any fires. It is concluded that in the main destruction is effected in the solid phase as a result of pyrolysis: the polyaromatic hydrocarbons polymerize to form elemental carbon. The great majority of the polyaromatic hydrocarbons are classed as non-volatiles so it can be expected that losses due to volatilization are minimal. If volatilization does occur, the volatiles will be hydrocarbons since combustion reactions are not observed in the gas phase. It is well-known that hydrocarbons can be easily absorbed by granulated activated charcoal. Also, it is well-known that granulated activated charcoal is a susceptor, so, when saturated, it can be used in a subsequent treatment as an additive to enhance heating (Microwave Processing of Materials, Publication NMAB-473, National Academy Press, Washington, D.C. 1994, p. 30.).

Field operations can be effected by siting the power module on a flatbed, having waveguides or ducts emanate from said flatbed to the waste enclosed by microwave reflective walls; at the walls of said enclosure, conductive ground probes to contain stray radiation (Faraday cage); air blowers to move gases through a granulated activated charcoal cannisters.

TABLE 1

Analyses of Microwave Treated Samples and Untreated Sample

| Compound | Untreated mg/Kg | Sample 6A mg/Kg | Sample 6B mg/Kg | Sample 6C mg/Kg |
|---|---|---|---|---|
| Acenapthalene | 15 | ND | ND | ND |
| Acenaphthene | 22 | ND | ND | ND |
| Anthracene | 150 | ND | ND | ND |
| Benzo(m)anthracene | 250 | ND | ND | ND |
| Benzo(b)fluoranthene | 680 | ND | ND | ND |
| Benzo(k)fluoranthene | 470 | ND | ND | ND |
| Benzo(a)pyrene | 450 | ND | ND | ND |
| Benzo(e)pyrene | 290 | ND | ND | ND |
| Benzo(g,h,i)perylene | 140 | ND | ND | ND |
| Carbazole | 14 | ND | ND | ND |
| Chrysene | 460 | ND | ND | ND |
| Dibenzo(a,h)anthracene | 70 | ND | ND | ND |
| Dibenzofuran | 7.9 | ND | ND | ND |
| Fluoranthrene | 660 | ND | ND | ND |
| Fluorene | 13 | ND | ND | ND |
| Indeno(1,2,3-ad)pyrene | 210 | ND | ND | ND |
| Napthalene | 9.8 | ND | ND | ND |
| Phenanathrene | 79 | ND | ND | ND |
| Pyrene | 750 | ND | ND | ND |

Protocol:Soxhlett extraction with 1:1 acetone:methylene chloride; An HP 5995C Gas Chromatograph/Mass Spectrometer was used to analyze the extracts. ND: none detectable Analyses: by Roy F. Weston, Inc., Edison, N.J. - an EPA-Certified lab

I claim:

1. A process for diminishing the concentration of polyaromatic hydrocarbons of members of the class of polyaromatic hydrocarbons consisting essentially of acenapthalene, acenapthene, anthracene, benzo(b)fluoranthene, benzo(a)pyrene, benzo(e)pyrene, benzo(g,h,i)perylene, benzo(k)fluoranthene, benzo(m)anthracene, carbazole, chrysene, dibenzo(a,h)anthracene, dibenzofuran, fluoranthrene, indeno(1,2,3)pyrene, naphthalene, phenanthrene, pyrene, consisting essentially of the steps of:

covering said members of the class of polyaromatic hydrocarbons sorbed on a soil substrate with discrete particles that are not non-combustible and non-microwave absorbing to form a two layer composite;

irradiating the two layer composite with microwave radiation until a red glow is observed.

2. The process as recited in claim 1 wherein a susceptor is added to the polyaromatic hydrocarbons.

3. The process as recited in claim 1 wherein susceptor used to absorb the volatiles is granulated activated charcoal.

4. The process as recited in claim 1 wherein water is added as a susceptor to the polyaromatic hydrocarbons.

5. The process as recited in claim 1 wherein iron or its compounds are added to the polyaromatic hydrocarbons as a susceptor.

6. The process as recited in claim 1 wherein granulated activated charcoal is added to the polyaromatic hydrocarbons as a susceptor.

7. The process as recited in claim 1 wherein a metal is added to the polyaromatic hydrocarbons as a susceptor.

8. The process as recited in claim 1 wherein the discrete particle is a salt.

9. The process as recited in claim 1 wherein the discrete particle is sand.

10. The process as recited in claim 1 wherein the polyaromatic hydrocarbons are not present on a substrate.

11. The process as recited in claim 1 wherein the polyaromatic hydrocarbons are present in trace quantities on a substrate.

12. The process as recited in claim 1 wherein the substrate is soil.

* * * * *